Figure 1:
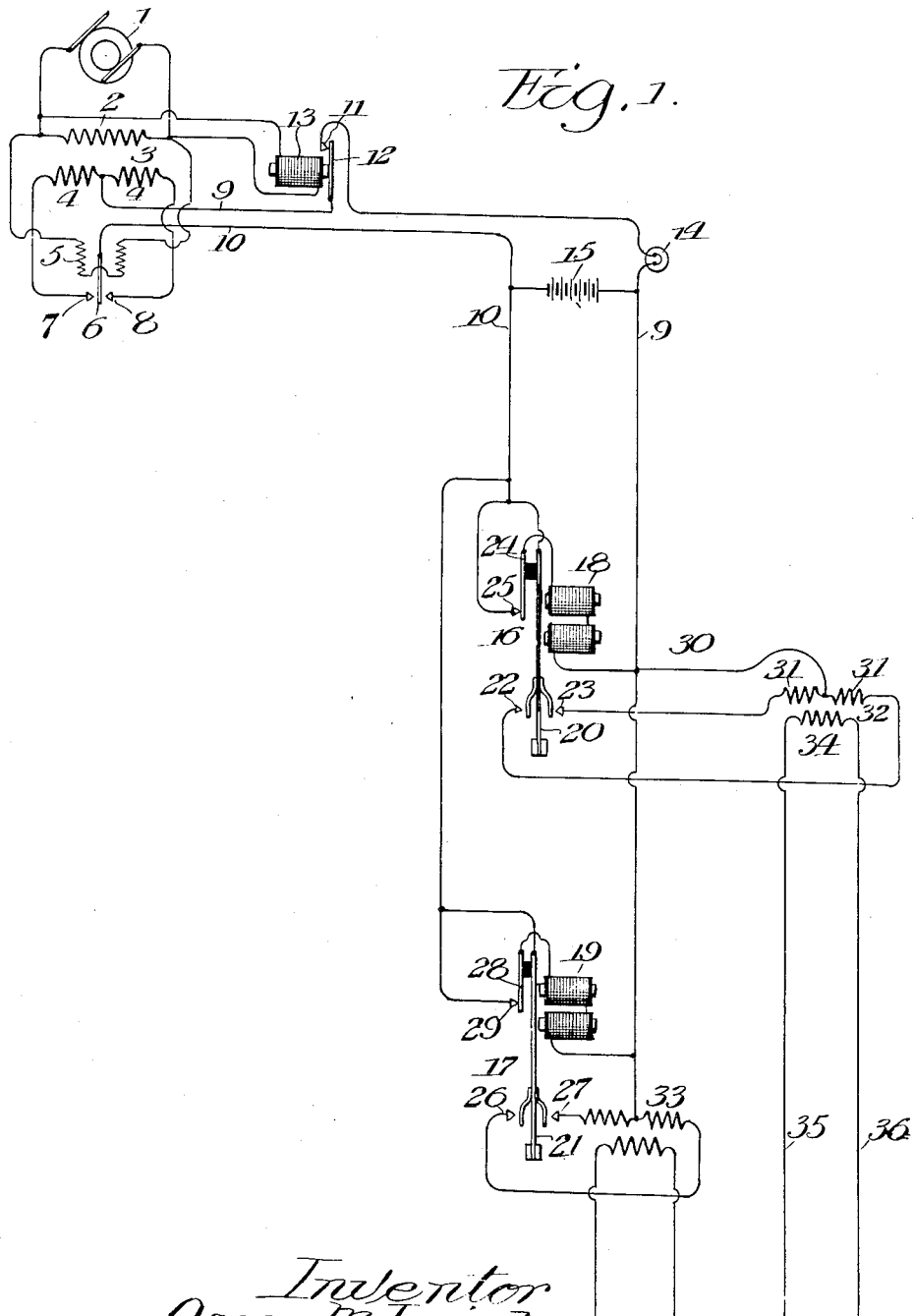

O. M. LEICH.
VIBRATOR.
APPLICATION FILED MAY 18, 1916.

1,286,034.

Patented Nov. 26, 1918.
2 SHEETS—SHEET 1.

Inventor
Oscar M. Leich
by May W. Zabel
Atty

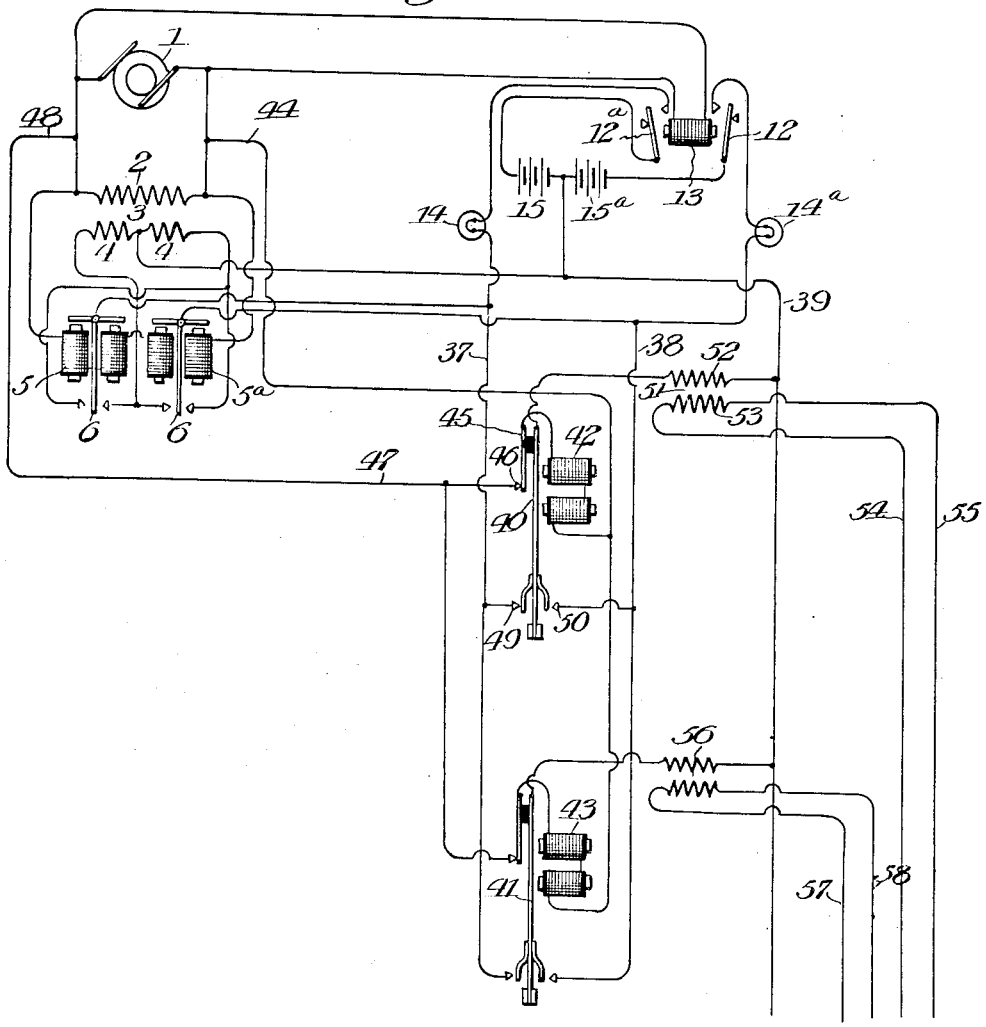

UNITED STATES PATENT OFFICE.

OSCAR M. LEICH, OF GENOA, ILLINOIS, ASSIGNOR TO LEICH ELECTRIC COMPANY, OF GENOA, ILLINOIS.

VIBRATOR.

1,286,034.   Specification of Letters Patent.   Patented Nov. 26, 1918.

Application filed May 18, 1916. Serial No. 98,265.

*To all whom it may concern:*

Be it known that I, OSCAR M. LEICH, a citizen of the United States, residing at Genoa, in the county of Dekalb and State of Illinois, have invented a certain new and useful Improvement in Vibrators, of which the following is a full, clear, concise, and exact description, reference being had to the accompanying drawings, forming a part of this specification.

My invention relates to vibrators and more particularly is an improvement over the vibrator and frequency changer disclosed in my application Serial No. 16,564, filed March 24, 1915. In this connection particular attention is also directed to my application Serial No. 98,266, filed May 18, 1916, and my application Serial No. 169,637, filed May 19, 1917. In accordance with the structure of my aforesaid prior application, I rectify the current from an alternating source of current, and then change the rectified current into an alternating or undulatory or pulsatory current of different frequency. A device of this nature is of particular utility for instance in telephone exchange work where the sixty cycle alternating current, for instance, of the lighting system may be rectified and its frequency changed so as to make it adaptable for use in ringing substation telephone instruments. A plurality of vibrators may be used of different frequency so that party line telephone instruments may be operated. I find that when transforming the rectified current into alternating current or pulsatory current of certain frequencies, for instance, those between 15 and 75, that it is desirable in order to get the best results to have a suitable equalizing current which may be preferably supplied from a battery so as to have the current which is made and broken by the vibrators of a more continuous character. These frequencies are, comparatively speaking, quite low and the signaling devices which are operated therefrom are susceptible to imperfections in the form of the operating current. It is thus desirable to obtain as uniform a signaling current of alternating character as is possible in order to get the best results.

In accordance with my present invention I so arrange a system of this character to equalize the rectified current, the battery being at times charged and at times discharging to thus provide this equalizing current. Under certain conditions of operation the battery may then be used to operate the vibrators should the main source of supply fail. It must be understood that the battery is not designed to carry the vibrator for any extended period, the battery being for equalizing purpose only in its normal operation but being of sufficient capacity to bridge over a slight gap should the primary source of current fail for a short period of time. I have also provided additional means very desirable and quite essential under certain conditions of failure of the primary source of current whereby the battery aforesaid, which I might in specific instances call a floating battery, is prevented from supplying current back through the original source of rectified current.

I will explain two specific forms which my invention may take more in detail by referring to the accompanying drawings, in which—

Figure 1 shows diagrammatically a system constructed in accordance with my invention, and Fig. 2 sets forth a modified form.

Referring more particularly to Fig. 1, I show a source of alternating current 1 which may be the ordinary sixty cycle lighting current, and which supplies the primary winding 2 of a transformer 3, the secondary winding having two coils 4, 4, as shown. Instead of this transformer, of course, I could use an impedance winding bridged across the circuit with a third conductor leading from its center point, thus making the connection direct instead of inductive, as well understood. A coil 5, preferably connected directly to the source 1, operates a suitable vibrator element 6, which vibrator element alternately engages the contacts 7 and 8. The contacts 7 and 8 are connected respectively to the terminals of the windings 4, 4. A conductor 9 leads from a central point of the windings 4, 4, and a conductor 10 leads from the vibrator element 6. The vibrator element is of course adapted to vibrate in synchronism with the frequency of the current provided from the source 1, thus to rectify the current, which is supplied to the conductors 9, 10. The conductor 9 has its continuity broken by the contacts 11 and 12, the contact 12 being under the control of a suitable electromagnet 13 connected directly to the source 1 so that this electromagnet keeps the contacts 11 and 12 closed when the main circuit is intact, but opens these contacts should a failure of current occur. A lamp or other suitable resistance 14 is interposed in the conductor 9 at some portion of the circuit between the connections to said circuit of an equalizing battery 15 and the connections of said conductors to the rectifying device above explained. The equalizing battery 15 is as a general rule "floated" so that this battery serves to maintain a more or less continuous current in the conductors 9 and 10 leading from said battery toward the remaining parts of the apparatus which will now be explained.

The battery in this connection of course receives current from the rectifying device at times and at times gives out current to provide a greater continuity of current than is supplied by said rectifying device. The battery is, as stated, floated across the circuit and is thus maintained at a potential substantially equal to that supplied by the said rectifier. In order to prevent the battery from sending current back to the rectifier I have introduced the lamp 14. This lamp has a sufficient resistance so that a considerable drop in pressure occurs across its terminals sufficient to make allowance for the conditions above stated, and thus to prevent the battery from "seesawing" with the rectifier. It will be understood of course that the battery 15 is not of very large capacity; consequently the resistance 14 would occasion a serious drop in pressure if the battery were attempting to send current to the circuit including the comparatively high resistance 14. This resistance thereby serves as a substantial check to the battery sending the current in that direction. The current which is supplied by the rectifier however, is ample and the pressure thereof can be so regulated that it supplies sufficient current to the battery and vibrator with the inclusion of the resistance 14, that is, the pressure of the rectifier can be sufficiently higher to overcome the high resistance 14. The conductors 9 and 10 may then be extended to operate any number of vibrators as may be required depending upon the number of different frequencies employed, and I show herein two vibrators respectively the vibrators 16 and 17, which vibrators preferably are attuned to different frequencies. The vibrators are provided with coils 18 and 19 respectively. These coils actuate vibratory elements 20 and 21 respectively. The vibrator 20 periodically makes contact with the contact points 22 and 23 and carries a further contact spring 24, which periodically contacts with the contact element 25. Similarly the vibratory element 21 contacts alternately with the contact elements 26 and 27 and carries an additional contact spring 28 periodically engaging contact element 29.

The circuit which flows through the vibrator to vibrate it in accordance with the frequency of its element extends from the conductor 9 through the coil 18, spring 24, contact 25, back to the conductor 10. The rectified current in the conductors 9 and 10 is then made and broken through the agency of the vibrator and furnishes interrupted alternating or pulsatory current of the desired frequency. This local circuit furnishing this current of changed frequency extends from conductor 9 by way of conductor 30 to the middle point of the primary windings 31, 31 of a transformer 32. The free extremities of said windings 31, 31 are respectively connected to the contact elements 22 and 23. Similarly the vibrator 17 has a transformer 33. The transformer 32 has a secondary 34 which is connected directly to the consumption circuit exemplified by the conductors 35 and 36. It will thus be seen that due to the vibratory element 20 current flows first in the left hand coil 31 and then in the right hand coil 31 and this reversal of energization of the magnetic circuit of the transformer 32 causes alternating current to flow in the secondary winding 34. The frequency is of course dependent upon the frequency of vibration of the element 20.

In Fig. 2, I show a system in general similar to the system illustrated in Fig. 1, there being a permanent source of current 1 and a transformer 3. I show however two rectifying elements 6 and 6$^a$, which rectifying elements are respectively connected to the conductors 37 and 38. The central point of the windings 4, 4 is connected to a conductor 39. I utilize two batteries 15 and 15$^a$ connected respectively between the conductors 39 and 37, and the conductors 39 and 38, suitable lamps 14, 14$^a$ being interposed for purposes previously explained in connection with Fig. 1. The relay 13 has two armatures, respectively the armatures 12 and 12$^a$, thus to control both the batteries 15 and 15$^a$. Whenever the main circuit fails the electromagnet 13 releases its armatures and opens the circuit through the batteries 15 and 15$^a$, thus preventing the current from these batteries from flowing back over the rectifying device, and also desirably cutting the batteries off from the vibrator elements to be presently explained, as the battery serves purely for equalizing purposes under normal conditions of operation.

There are two vibrators 40 and 41 similar to the vibrators 20 and 21 of Fig. 1. These vibrators however have their coils 42 and 43 served with current directly from the main source of current 1 and the circuit for the vibrator 40 is traced, for instance, from the main source of supply by way of conductor 44, through coil 42, contact spring 45, contact 46, conductor 47, conductor 48, back to the source of supply. Vibrator 41 is similarly actuated. Vibrator 40 has coöperating contact elements 49 and 50 with which it alternately makes contact. There being two vibratory elements in the rectifier no double wound transformer is necessary, but a single wound transformer 51 can be employed having the primary winding 52 and secondary winding 53. The secondary winding 53 is directly connected to the consumption circuit exemplified by the conductors 54 and 55. The primary winding 52 is connected between the conductor 39 and the vibratory element 40, which vibratory element is alternately connected with the conductor 37 through the agency of the contact 49 and the conductor 38 through the agency of the contact 50. Similarly the vibrator element 41 controls the transformer 56, which has its secondary connected to the consumption circuit 57, 58.

From what has been described the nature of my invention will be clear to those skilled in the art. Batteries 15, 15ª serve as equalizers to supply a more continuous current for control by the vibrators and is furnished directly from the rectifier. Means are provided so that these batteries cannot seesaw with the rectifier.

Modifications within the scope of the appended claims may of course be made without departing from the spirit of my invention.

Having however thus described two forms which my invention may take, what I claim as new and desire to secure by Letters Patent is:

1. In a device for supplying signaling currents the combination with a source of pulsating current, a vibrator to transform said pulsating current into undulatory current of a different fundamental periodicity, an equalizer battery associated with said source to supply a more even flow of current to said vibrator, a resistance element interposed between said battery and said source, and means controlled by the supply of current to said source of pulsating current to control the circuit of said battery.

2. In a device for supplying signaling currents the combination with a source of pulsating current, a vibrator to transform said pulsating current into undulatory current of a different fundamental periodicity, a floating battery associated with said source to supply a more even flow of current to said vibrator, a resistance element interposed between said battery and said source, and means controlled by the supply of current to said source of pulsating current to control the circuit of said battery.

3. In a device for supplying signaling currents the combination with a source of alternating current, a rectifier for rectifying the current from said source, a vibrator operated from said source to transform the current supplied by said source into undulatory current of a given frequency, an equalizer battery interposed between said rectifier and said vibrator, and means responsive to the current conditions in said source of current supply to control the circuit of said battery.

4. In a device for supplying signaling currents the combination with a source of alternating current, a rectifier for rectifying the current from said source, a vibrator operated from said source to transform the current supplied by said rectifier into undulatory current of a given frequency, an equalizer battery interposed between said rectifier and said vibrator, and a resistance element interposed between said battery and said rectifier.

5. In a device for supplying signaling currents the combination with a source of alternating current, means to transform said alternating current into pulsating current, a vibrator to transform the current from said means into undulatory current of different fundamental periodicity, an equalizer battery to equalize the current from said means, a consumption circuit supplied by said vibrator, and an inductive transformer interposed between said source and said consumption circuit.

6. In a selective frequency signaling system, the combination of an alternating current source of supply, a signaling circuit, a vibratory rectifier for changing the alternating current to a pulsatory uni-directional current, a vibratory electromagnetically operated means connected to feed said rectified current to said signaling circuit at a fundamental rate of pulsation different from the rate of pulsation of said rectified current, and an equalizer battery to equalize the current supply from said vibratory rectifier.

7. In a selective frequency signaling system, the combination of an alternating current source of supply, a signaling circuit, a vibratory rectifier for changing the alternating current to a pulsatory uni-directional current, a vibratory electromagnetically operated means connected to feed said rectified current to said signaling circuit at a fundamental rate of pulsation different from the rate of pulsation of said rectified current, an equalizer battery to equalize the current supply from said vibratory rectifier, and a resistance interposed between said vibratory rectifier and said vibratory electromagnetically operated means.

8. In a selective frequency signaling system, the combination of an alternating current source of supply, a signaling circuit, a vibratory rectifier for changing the alternating current to a pulsatory uni-directional current, a vibratory electromagnetically operated means excited from the alternating current source of supply connected to feed said rectified current to said signaling circuit at a fundamental rate of pulsation different from the rate of pulsation of said rectified current, and an equalizer battery to equalize the current supply from said vibratory rectifier.

9. In a selective frequency signaling system, the combination of an alternating current source of supply, a signaling circuit, a vibratory rectifier for changing the alternating current to a pulsatory uni-directional current, a vibratory electromagnetically operated means excited from the alternating current source of supply connected to feed said rectified current to said signaling circuit at a fundamental rate of pulsation different from the rate of pulsation of said rectified current, an equalizer battery to equalize the current supply from said vibratory rectifier, and a resistance interposed between said vibratory rectifier and said vibratory electromagnetically operated means.

10. In a selective frequency signaling system, the combination of an alternating current source of supply, a signaling circuit, a vibratory rectifier for changing the alternating current to a pulsatory uni-directional current, a vibratory electromagnetically operated means excited from the alternating current source of supply connected to feed said rectified current to said signaling circuit at a fundamental rate of pulsation different from the rate of pulsation of said rectified current, an equalizer battery to equalize the current supply from said vibratory rectifier, and a transformer interposed between said electro-magnetically operated means and said consumption circuit.

11. In a selective frequency signaling system, the combination of an alternating current source of supply, a signaling circuit, a vibratory rectifier for changing the alternating current to a pulsatory uni-directional current, a vibratory electromagnetically operated means excited from the alternating current source of supply, connected to feed said rectified current to said signaling circuit at a fundamental rate of pulsation different from the rate of pulsation of said rectified current, an equalizer battery to equalize the current supply from said vibratory rectifier, a resistance interposed between said vibratory rectifier and said vibratory electromagnetically operated means, and a transformer interposed between said electromagnetically operated means and said consumption circuit.

In witness whereof, I hereunto subscribe my name this 10th day of April, A. D. 1916.

OSCAR M. LEICH.

Witnesses:
MAX W. ZABEL,
HAZEL A. JONES.